United States Patent Office 3,748,152
Patented July 24, 1973

3,748,152
TREATING OLIVES WITH CHLORINATED BRINE BEFORE FREEZING
John R. Webster, Lindsay, Calif., assignor to Consolidated Olive Growers, Lindsay, Calif.
No Drawing. Filed Oct. 19, 1971, Ser. No. 190,658
Int. Cl. A23b 7/00
U.S. Cl. 99—156                                    1 Claim

ABSTRACT OF THE DISCLOSURE

Olives are preserved prior to freezing by storage and transport in a sanitized holding solution, such as a sanitized brine. The brine is discarded at the time the olives are frozen.

BACKGROUND OF THE INVENTION

The present invention relates to the preservation of olives and more particularly to an improved method of temporarily preserving olives, such as ripe olives, which are to be subsequently frozen.

The term ripe olives as used therein is intended to refer to olives which have been processed by the so-called olive process. Olives are generally harvested at the time they reach a yellow-green state of maturity and usually have an extremely bitter taste which is caused by the presence of glucoside in the olives. The ripe olive process consists essentially of hydrolyzing the bitter glucoside in the olives, then oxidizing the olives to a dark preferably black color and finally washing the olives to a non-acid final state. Thereby, ripe olives having a mild, nutty flavor are produced.

It has been found in practicing the ripe olive process that unattractive brown colored olives will be produced instead of attractive black olives if the olives are hydrolyzed to too great an extent before being oxidized. Accordingly, a ripe olive process in which alternate lye and oxidizing treatments are employed is generally used to produce black olives.

One process effective to produce ripe olives of an attractive black color comprises alternately subjecting harvested olives which are originally in a yellow-green state of maturity to lye and oxidizing treatments for several days, such as 4-7 days, and then washing the olives for 2-3 days to remove the lye. The lye treatment may consist of soaking the olives in a 1% by weight sodium hydroxide solution for about 3 hours. It is noted that each time the olives are subjected to a lye treatment the sodium hydroxide penetrates approximately an additional 1/16" into the olive skin and that the olives are treated until the lye has penetrated to the pit of the olive so as to hydrolyze all the bitter olive glucoside. The oxidizing treatment in this process may consist of soaking the olives after each lye treatment in aerated water for approximately 21 hours. The aerated water may be produced by bubbling air through water and the olives gradually darken with each oxidizing treatment until they become black. The lye is removed by washing from the olives by soaking them in fresh water. The fresh water is changed about every eight hours until the juice from the olives has a pH of approximately 8. The last one or two changes of fresh water are heated to about 130°–185° F. to pasteurize the olives and accelerate the removal of the lye therefrom.

Heretofore, in the manufacture of frozen foods containing ripe olives, the olives have been pressure cooked in cans prior to freezing. The purpose of pressure cooking the ripe olives was to sterilize the olives to prevent botulism or other spoilage. The hermetically sealed can prevented re-contamination by airborne microbes. The frozen food manufacturer then uncanned the ripe olives, incorporated and froze them in the final food product.

This method of canning and pressure cooking the ripe olives in order to preserve them until freezing has several significant disadvantages. One obvious disadvantage with this method of preserving olives is the necessity of providing cans and the expenses associated with the canning, pressure cooking and uncanning steps. Another disadvantage is that the cooking of the olives prior to freezing has a detrimental effect on the texture of the ripe olives. It has been found that olives which have been pressure cooked, frozen and then thawed lose their natural firm texture and become undesirably soft.

SUMMARY OF THE INVENTION

It is, accordingly, an object of the present invention to provide an improved method for preserving ripe olives prior to freezing which obviates the need for canning and pressure cooking the olives prior to freezing and which produces olives which have a firm texture and fresh taste.

In accomplishing this and other objects, there is provided in accordance with the present invention a method for preserving ripe olives prior to freezing in which the ripe olives are stored and transported in a cold sanitized holding liquid, such as sanitized brine. The brine is discarded at the time the olives are frozen by a frozen food manufacturer.

Additional objects of the present invention reside in the specific method hereinafter particularly described.

DETAILED DESCRIPTION OF THE PREFERRED EMBODIMENT

Ripe olives processed in accordance with the aforedescribed ripe olive process are stored after pasteurization in a suitable sanitized holding solution, such as a sanitized brine or water. The term sanitized holding solution refers to a solution, such as a brine, which has been treated to contain very few microbes. The ripe olives are preferably pasteurized at a temperature within the range of 130° F. to 185° F. The term brine is intended to refer to any salt (NaCl)-water solution and a diluted brine having a final salt content of 2% to 3% by weight is preferably used in this process. A brine having a final salt content of 2% to 3% by weight may be provided by storing ripe olives containing substantially no salt in a brine having a 3.5% to 4.5% salt content by weight at the time olives are stored therein. The unsalted ripe olives absorb a portion of the salt in the solution so that a weak brine having a 2% to 3% by weight salt content is produced. This weak brine in which the ripe olives are stored adds flavor to the ripe olives as well as preserving the olives by physically isolating the olives from air and bacteria while preventing the olives from drying and shriveling.

The brine or other suitable holding solution in which the ripe olives are stored may be sanitized by chlorination by mixing or injecting sodium hypochlorite (NaClO), chlorine gas, sodium chlorite (NaClO$_2$) or any other suitable source of chlorine or chlorine dioxide into the brine. The chlorine produced or injected into the brine kills bacteria and preferably the residual content of the chlorine in the brine should be in the range of 1 to 5 parts per million. Tests have shown that low chlorine concentrations in the brine of up to 20 parts per million do not cause undesirable flavors in the stored olives. The chlorine in the brine in addition to disinfecting the olives also disinfects the drums or portable containers in which the olives are stored and transported. Alternate methods of sanitizing the brine or other suitable holding solution, without the use of chlorine, include the following: boiling and cooking the solution, filtering the solution through microb-removing filter material; using ozone; or pumping the solution through glass tubes exposed to strong ultraviolet light.

It has been found that ripe olives may be satisfactorily preserved prior to freezing for a period of two to four days by being stored in a brine solution sanitized by chlorination containing at the time of storing the olives therein 4% salt by weight and 2 parts per million chlorine. The sanitized brine is maintained at a temperature of 50° F. or below, preferably at 40° F., by any suitable means of refrigeration. The olives stored in the cold sanitized brine are hauled to the frozen food producer in tanks or other suitable containers generally within 24 hours. The tanks or containers are preferably unsealed, or only briefly sealed for a period not exceeding twenty-four hours, so as to allow the entry of air into the containers, thereby to expose the sanitized brine to air. The frozen food producer removes the olives, discards the sanitized brine and freezes the olives in a loose individual state so that they may be poured in their frozen state. It is noted that the bacteria clostridium botulinum which may grow in non-acid foods, such as olives, does not grow in the sanitized brine since this bacteria is anaerobic and cannot grow in the brine when the brine is exposed to air and further, since the bacteria does not grow at the cold temperature at which the brine is maintained.

Ripe olives temporarily stored as above-described maintain a firmer texture after being frozen and thawed than pressure cooked olives and the bacteria count in the ripe olives is maintained relatively low by the cold sanitized brine. Because of the almost bacteria free starting point for the ripe olives, the olives are maintained substantially bacteria free in the holding solution provided by the cold, sanitized brine during their period of storage. Frozen ripe olives which have been temporarily preserved by this method prior to freezing also have a fresh natural flavor when thawed.

Thus, there has been provided an improved method for preserving olives, particularly ripe olives, which obviates the need for canning and pressure cooking the oilves and produces olives having a firm texture and natural fresh taste.

Although I have herein shown and described my invention in what I have conceived to be the most practical and preferred embodiment, it is recognized that departures may be made therefrom within the scope of my invention.

I claim:

1. The method of treating olives which have been processed by the ripe olive process, comprising:

pasteurizing the olives at a temperature of approximately 185° F.;

cooling the pasteurized olives;

storing the olives for a time period not greater than four days in a brine maintained at a temperature not greater than 50° F. which has been sanitized by chlorination prior to placing the olives therein whereby the holding solution functions to maintain said olives substantially bacteria free by physically isolating said olives in a substantially bacteria free medium, the sanitized brine containing at the time the olives are stored therein 2% to 4.5% salt by weight and the residual content of the chlorine in the brine being in the range of one to five parts per million, the sanitized brine being exposed to air during at least a portion of the time the olives are stored therein to prevent the growth of the bacteria clostridium botulinum therein;

separating the olives from the brine solution prior to expiration of the four day storage period; and freezing the olives upon separating them from the brine.

References Cited

UNITED STATES PATENTS 3,480,448 11/1969 Etchells et al. ........ 99—156
1,695,489 12/1928 Hewett .............. 99—156

OTHER REFERENCES

W. V. Cruess, "The Effect of Cold on Olives," The Fruit Products Journal, October, 1937, vol. 17, No. 2 pp. 40; 59.

W. V. Cruess et al., "The Home Pickling of Olives," October 1945.

W. V. Cruess, "Collapse and Shriveling of Olives During Storage in Final Brine and During Retorting," The Fruit Products Journal; October 1937, vol. 17, p. 48.

NORMAN YUDKOFF, Primary Examiner

C. P. RIBANDO, Assistant Examiner

U.S. Cl. X.R.

99—103, 193